Nov. 15, 1949　　　　　　　F. OFFNER　　　　　　　2,488,430
METHOD AND APPARATUS FOR MEASURING THE DIMENSIONS OF
OBJECTS BY THE RADIATION DIFFERENTIAL BETWEEN THE
OBJECT TO BE MEASURED AND A COMPARISON OBJECT
Filed April 15, 1946　　　　　　　　　　　　　5 Sheets-Sheet 1

INVENTOR.
FRANKLIN OFFNER
BY Stowell & Evans
ATTORNEYS

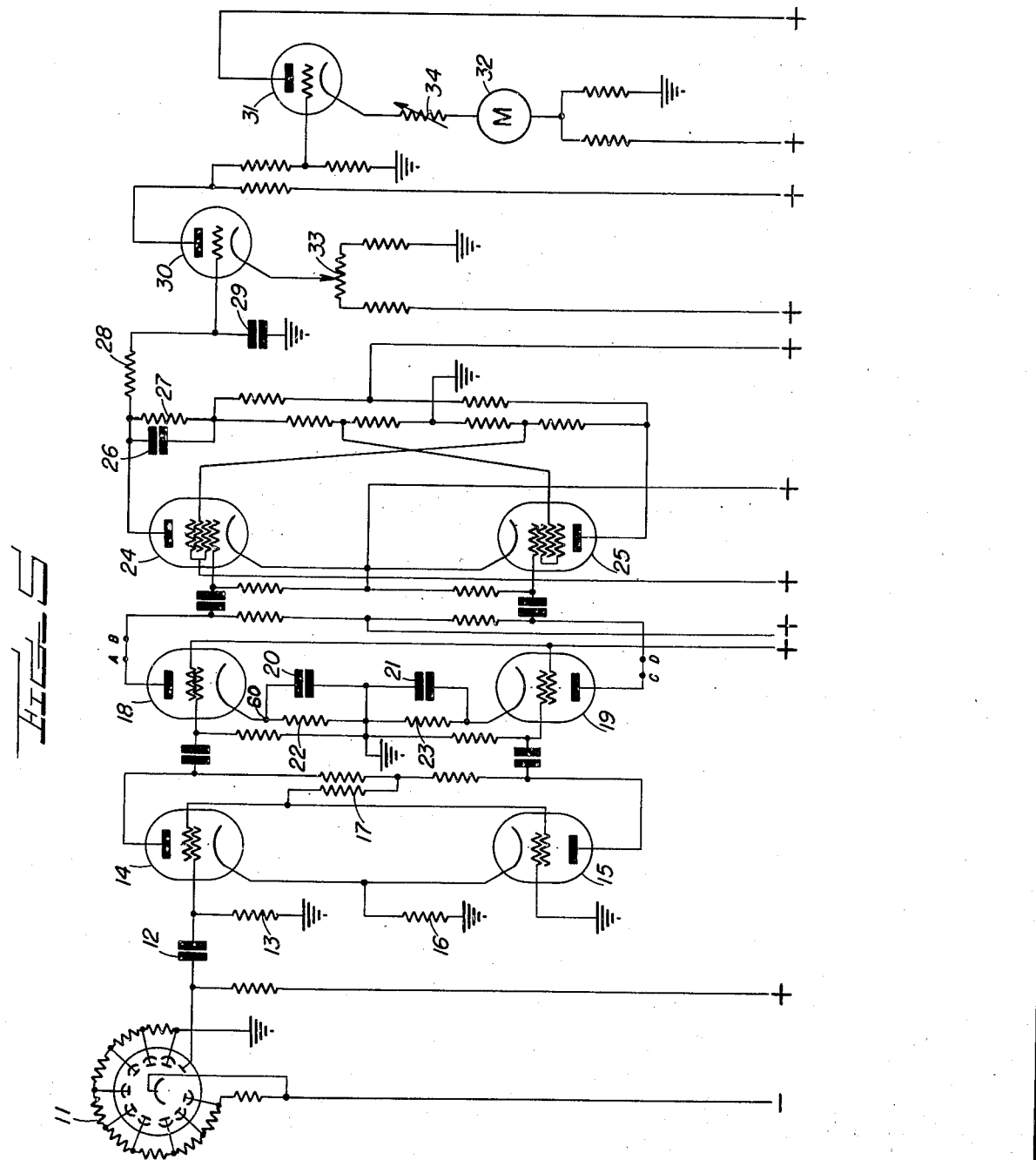

INVENTOR.
FRANKLIN OFFNER
BY
ATTORNEYS

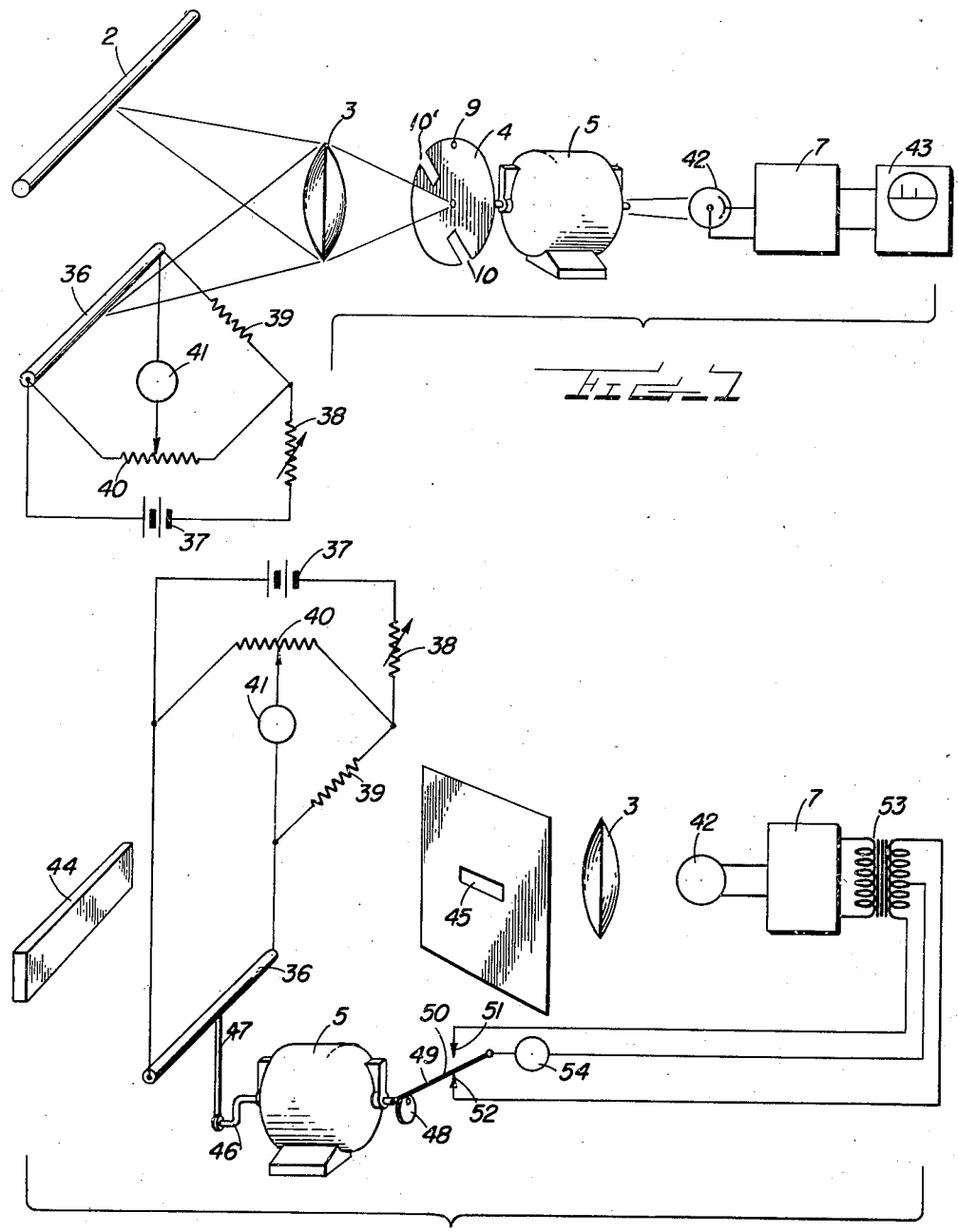

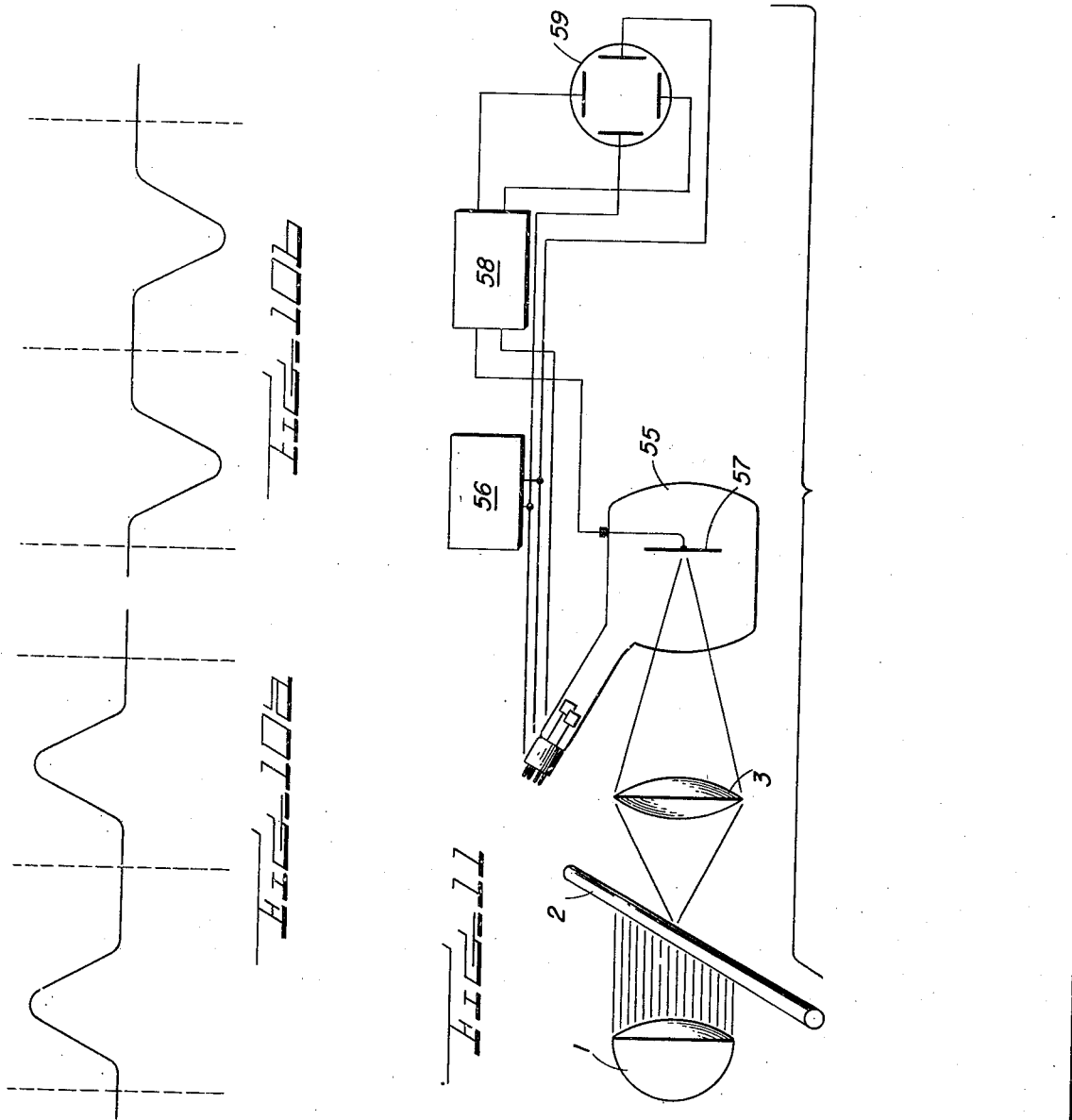

Patented Nov. 15, 1949

2,488,430

UNITED STATES PATENT OFFICE 2,488,430

METHOD AND APPARATUS FOR MEASURING THE DIMENSIONS OF OBJECTS BY THE RADIATION DIFFERENTIAL BETWEEN THE OBJECT TO BE MEASURED AND A COMPARISON OBJECT

Franklin Offner, Chicago, Ill.

Application April 15, 1946, Serial No. 662,377

9 Claims. (Cl. 250—214)

The invention relates to the measurement of objects and particularly to a method and device for utilizing the radiation differential between an object to be measured and a comparison object to determine the temperature or dimensions of the object.

A purpose of the invention is to measure a dimension of an object without contact therewith.

Another purpose of the invention is to measure the temperature of an object.

A further purpose of the invention is the measurement of the temperature or dimensions of a moving object.

These and other objects and advantages of the invention will be more clearly apparent from the following description.

Basically, the invention utilizes the radiation differential between an object to be measured and a comparison object, which may be a background of different radiation characteristics from the object to be measured or an object of fixed and determinable radiation characteristics, to determine the temperature or a dimension of the object.

The invention is particularly useful in determining the dimensions or the temperature of a moving object such as a wire or rod undergoing metallurgical or other treatment.

The method of the invention comprises periodically and successively scanning radiation emitted by the object and a comparison object, converting the radiation differential into an electrical signal which is a function of the radiation differential and measuring the electrical signal, preferably in terms of dimension or temperature of the object as may be desired. The scanning may be effected optically or electronically.

Typically, the measuring device of the invention comprises means adapted to convert radiation into an electrical signal, such as a photoelectric cell, thermopile, bolometer, or the mosaic plate of an iconoscope; means for periodically and successively scanning upon said radition-converting means radiation from the object to be measured and from a comparison object; and means for measuring the electrical signal thereby produced.

The invention will be more particularly described with reference to the accompanying drawings in which:

Fig. 7 is a diagrammatic representation of a modification of the device for temperature measurement;

Fig. 8 illustrates the wave-form of the cur- in the device of Fig. 7;

Fig. 9 is a diagrammatic representation of a modified temperature measuring device;

Figs. 10a and 10b illustrate wave-forms of currents in the device of Fig. 9, and Fig. 11 is a diagrammatic representation of an electronic scanning device for dimension measurement.

Figure 1:
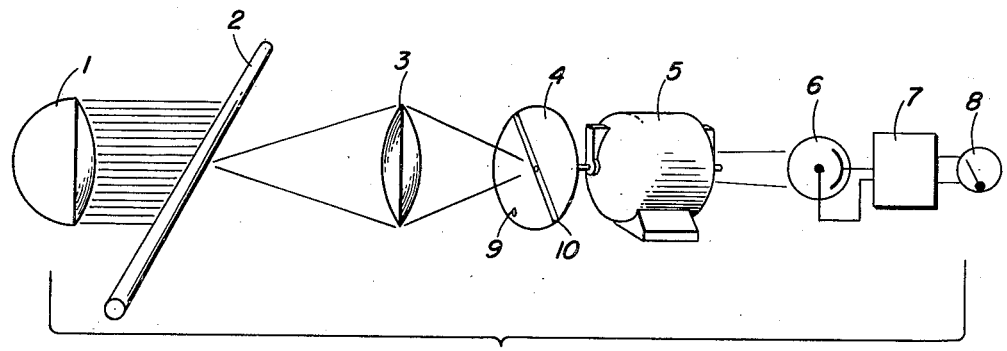
Fig. 1 is a diagrammatic representation of the basic elements of a dimension measuring device embodying the principles of the invention as applied to mechanical scanning of a non-incandescent object.

In Fig. 1, 1 is a light source, providing a substantially uniformly illuminated background. 2 is a rod whose diameter is to be measured. 3 is a lens, forming an image 10 of the rod on scanning disc 4 which is rotated at a uniform rate by motor 5. Photoelectric cell 6 is illuminated by the light passing through aperture 9 in scanning disc 4. The output of cell 6 is amplified in electron tube amplifier 7, and measured by meter 8.

Figure 2:
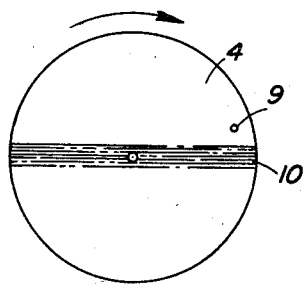
Fig. 2 illustrates the image on the scanning disc.

The appearance of the image of the rod 2 on 4 is shown in Fig. 2. The disc is illuminated, except where the rod obstructs the light. Thus, as aperture 9 crosses the image, the light on 6, and the current output of 6 (and as amplified, of 7), will fall from a maximum to substantially zero, as shown in Fig. 3, which illustrates the variation in the illumination and current over several cycles of revolution of 4.

Figure 3:
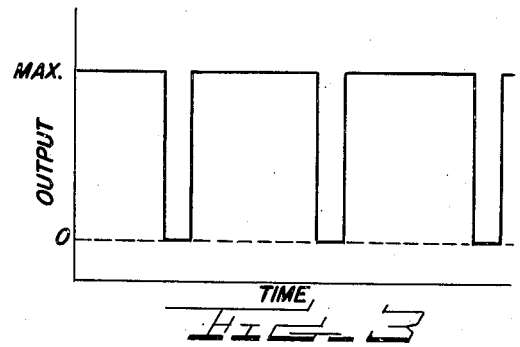
Fig. 3 shows the variation in the output of the photocell with time, with a non-incandescent object.

It is seen from Fig. 3 that if the rod is removed, the current output of 7 and thus the reading of 8, which registers the average output current of 7, will be a maximum. When the rod is inserted, the reading will decrease; and the decrease will be substantially proportional to the diameter of the rod. Thus, if all other factors are kept constant, 8 may be calibrated directly in terms of the diameter of 2.

If 2 is incandescent, a dark background may be substituted for 1. The illumination on 6, and the output of 6 and of 7 will vary as in Fig. 4. The instrument operates in a similar manner to the former case, except 8 reads zero for zero diameter, and increases with diameter.

To read the radiation temperature of 2, rather than its diameter, 8 may be made to read the peak value of the output of 7, (rather than the average). This peak value is a function of temperature, and 8 may thus be calibrated in terms of temperature. For this purpose, 8 may be any one of a number of peak-reading voltmeters or milliameters well known to the art.

The basic device of Fig. 1 has several disadvantages: the reading depends upon the intensity of 1 (or the radiation of 2), the sensitivity of 6 and 7, and the efficiency of the optical system. These difficulties are largely overcome in the preferred device shown in Fig. 5. The optical system and scanning disc, 1, 2, 3, 4, 5, 9, 10 are as in Fig. 1. The light beam passing the scanning disc falls on the photo-sensitive electrode of 11, which is an electron-multiplier photo-tube, with associated resistors. This is coupled to the first amplifier tube 14 through condenser 12 and resistor 13. The signal developed by 14 is produced in inverse phase by tube 15, which is coupled to 14 through common screen-grid resistor 17 and cathode resistor 16.

The signals developed by 14 and 15 are coupled to automatic volume control tubes 18 and 19, which have large cathode condensers, 20 and 21, shunted by high resistors 22 and 23.

The signal output of 18 and 19 is coupled into a trigger pair of tubes 24 and 25. These are preferably pentagrid tubes, with their #3 grids interlocked with the opposite plate circuit, as shown, and in a manner familiar to the art. In the plate circuit of 24 is a small condenser 26, shunted by a high resistor 27. These serve to amplify the signal produced, as described later.

The D.-C. signal developed at the plate of 24 is filtered of the signal components of disc frequency and higher, by resistance 28 and condenser 29. The D.-C. signal is amplified by tubes 30 and 31, which form a conventional D.-C. amplifier. The output current is read on meter 32. The operating point of the amplifier is set by resistor 33, and the meter sensitivity adjusted by resistor 34.

The operation of the circuit is illustrated in Figs. 6a–6g. In 6a is shown the illumination falling on the cell 11 as the hole 9 in disc 4 crosses the image 10 of rod 2. It is seen that the illumination of the background is now not necessarily uniform. This is one advantage of the circuit of Fig. 5. 6a also represents the signal output of 11. 12 and 13 are proportioned to differentiate this signal. The signal developed by 14 is thus as shown in 6b. The signal developed by 15 is the reverse of this, and is shown in 6c.

In 6d is shown a series of impulses as would be produced by successive revolutions of disc 4. $t_2$ represents the period of revolution of the disc; $t_1$ represents the time required for scanning hole 9 to cross image 10 of rod 2. $t_1$ is the time between positive and negative peaks of the signal output wave. The diameter of the rod is then proportional to the ratio of $t_1$ to $t_2$. The purpose of the remainder of the circuit is to determine this ratio accurately. There may alternatively be used a number of scanning apertures 9. Then $t_2$ is the time interval between scanning apertures crossing the image.

Figure 6A:
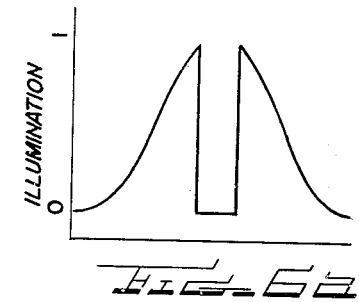
Figs. 6a–6g show wave-forms at various points in Fig. 5.
Figure 6B:
Figure 6C:
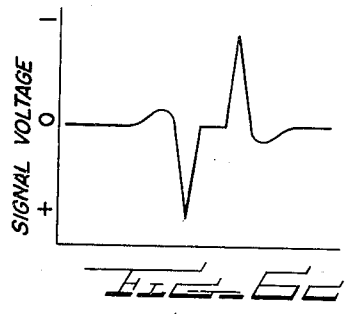
Figure 6D:
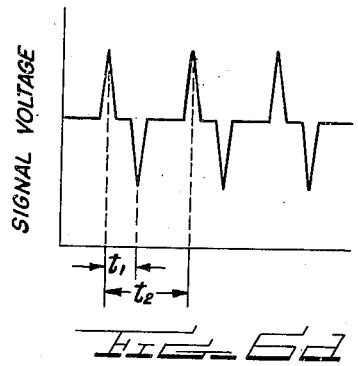
Figure 6E:
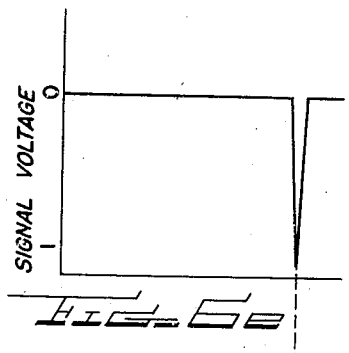
Figure 6G:
Figure 6F:
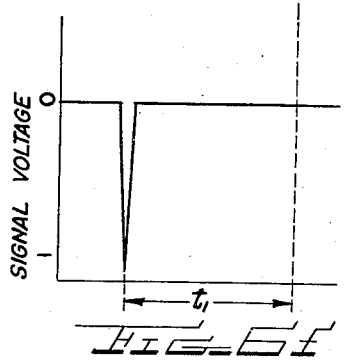

The automatic volume control tubes 18, 19 transmit only the positive peaks of the signals from 14 and 15 shown in 6b and 6c. For example, a positive signal applied to 18 causes space current to flow through the tube. This charges up condenser 20 to a voltage which will almost cut off all space current flow. The voltage on 20 will slowly leak off through 22, so that a small pulse of space current will flow on the next positive peak. However, no space current flows on negative peaks applied to 18. The action of 19 is exactly similar. A negative peak on 18 is accompanied by a positive peak on 19, so that a pulse of space current in 19 occurs at the negative peak on 18. The space current pulses in 18 and 19 is partially plate current, thus producing signal pulses in the plate circuits of 18 and 19. These pulses are shown in Figs. 6e and 6f, respectively. The time, $t_1$, is now given by the time between the negative peaks in the plate circuits of 18 and 19. The pulses are now of very short duration, so that the time may be accurately measured.

In trigger pair 24, 25, tube 25 is normally conducting. When a negative signal pulse (as shown at 6f) is applied to the number 1 grid of 25, the tube is cut-off, and 24 then conducts. It continues to conduct (neglecting the effect of 26 and 27) until a negative pulse (as shown at 6e) is applied to the #1 grid of 24. 25 then again conducts. The plate current pulses through 24, corresponding to the signal pulse of Fig. 6d, are shown in 6g. A meter in the plate circuit of 24, reading the average plate current, would give the ratio $t_1/t_2$, and thus the diameter of the rod. However, the actual current would usually be too small to measure. It is therefore preferably amplified.

Condenser 26 is inserted in the plate circuit of 24. 26 is shunted by resistor 27. The brief pulses of plate current 24 charge up 26, producing a relatively large voltage across it.

The voltage across 26 is amplified by 30, and the output of 30 is coupled to cathode-follower 31, which provides current to operate meter 32.

By means of resistor 29, 32 may be adjusted to center-scale reading at some desired diameter of rod 2. 32 then will read the variation in diameter from the desired value; 34 may be adjusted so that each scale division on 32 will read, for example, .001 inch.

32 may be replaced by, or put in series with, a graphic recorder. Thus, if rod 2 is moving longitudinally, a continuous record of its diameter is given.

If rod 2 emits sufficient radiation so that light source 1 is unnecessary, connections ab, cd are interchanged so that a is connected to d, and c to b.

When the rod is sufficiently incandescent, the AVC tube 18 may also be used to give the temperature. The voltage of the positive peak applied to 18 is dependent upon the temperature; substantially this voltage is developed across 20 (plus a constant). Thus, a vacuum tube voltmeter connected to point 60 will give the temperature of 2.

In place of the photo-electric cell 11, other radiation-sensitive cells may be employed: e. g., a thermopile or bolometer. A thermopile would be particularly advantageous for temperature measuring purposes.

Figure 5:
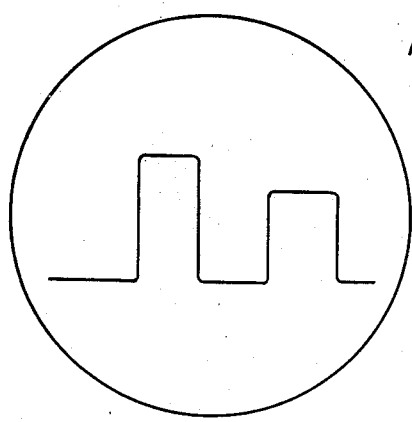
Fig. 5 is a diagram of a modified dimension measuring circuit.

The circuit of Fig. 5 may not give sufficiently precise results for temperature measurements. Any change in the radiation transmission of the optical system will cause an error. When temperature measurement only is desired, the arrangement of Fig. 7 is preferably employed. Comparison rod 36 is electrically heated by battery 37 through adjusting resistor 38. The resistance of 36, which should be of material having a fairly high temperature coefficient of resistance, is measured by the bridge consisting of fixed balancing arm resistor 39, variable balancing resistor 40, and galvanometer 41.

Images 10' and 10, respectively, of both 36 and 2, are thrown on disc 4, so that radiation from each is intercepted in turn by hole 9. The radiation falls on sensitive cell 42, which may be a photo-electric cell, thermopile, or other radiation-sensitive device. The output of 42 is amplified by 7, and applied to oscillograph 43.

In operation, the heights of the signals produced as the radiation from 36 and 2 in turn is intercepted by 9, are viewed on 43. These may appear as in Fig. 8. Resistor 38 is adjusted to make the two peaks the same height. Resistor 40 is next adjusted to balance, as read on 41. 40 is calibrated in terms of the temperature of 36, and thus of 2.

A modification of the temperature measuring device of Fig. 7 is illustrated in Fig. 9. The object whose temperature is to be measured is 44. Slit 45 is placed between 44 and lens 3. The image of 45 falls on cell 42. The optical system is proportioned so that the image of 44 covers the image of the slit on 42. Heated comparison rod 36, which is connected to a heating battery 37 and bridge circuit, as in Fig. 8, is moved cyclically in and out of the field of view of 42 by motor 5, through eccentric 46 and lever 47. Another eccentric 48, the phase of which is adjustable with respect to that of 46, and lever 49 moves contact 50 between contact points 51 and 52.

The output of cell 42 is amplified by 7. The output of 7 is balanced to give equal positive and negative signals; as, for example, by transformer 53 having a center-tapped secondary. 54 is a device responsive to average current. It may be a meter, relay, or vacuum tube operated control device. It is switched alternately between the two output signals provided by 53, by contacts 50, 51, 52, which are operated synchronously with the motion of 36 in and out of the field of view of 42, but with adjustable phase relationship.

In operation, if 36 emits more radiation per unit area of surface than 44 (i. e., if its color temperature is higher), during that portion of the cycle of operation when 36 is in the field of view of 42, the output of 42 will be increased, and thus an alternating voltage of wave-form as shown in Fig. 10a is developed across the secondary of 53. The synchronous switch 50, 51, 52 operates in the phases shown by the dotted lines, and acts as a synchronous full-wave rectifier. A positive current thus, for example, flows in this case through 54, and this then indicates 36 is hotter than 44.

If, on the other hand, 36 is less hot than 44, the wave form of the output is as shown in Fig. 10b; it is seen to be reversed in phase. In this case, a negative current flows through 54, indicating that 36 is less hot than 44. The magnitude of the current through 54 will indicate the temperature differential.

The device of Fig. 9 may be used to indicate the departure of temperature of 44 from a fixed value. In this case 36 is maintained at a constant temperature. 40 is left at the setting corresponding to this temperature, and 38 is kept adjusted to maintain the bridge in balance, as indicated on 41. This balance may be maintained automatically by one of the self-balancing circuits well known to the art. Then the departure of the temperature of 44 from that of 36 is registered on 54.

To use the device of Fig. 9 to measure the temperature of 44, 38 is adjusted until zero current is shown by 54. Resistor 40 is then adjusted to balance 41. The reading of 40 then indicates the temperature of 44. The balancing action may be made automatically by self-balancing circuits.

An electronic scanning method for measuring the lineal dimensions of an object may be employed in place of the mechanical scanning systems of Fig. 1 and Fig. 5. Such a method is illustrated in Fig. 11. 55 is an electronic-scanning image tube (iconoscope). 56 is a saw-tooth sweep oscillator, which sweeps the electron beam over the mosaic target 57, on which is projected the image of rod 2. The signal output of 55 is amplified by 58. The wave-form of the output of 58 will be similar to that illustrated in Figs. 3, 4 or 6a, under similar conditions of image formation. The diameter of the rod may thus be measured by circuits similar to those following the photoelectric cell 6 of Fig. 1, or 11 of Fig. 5.

Figure 4:
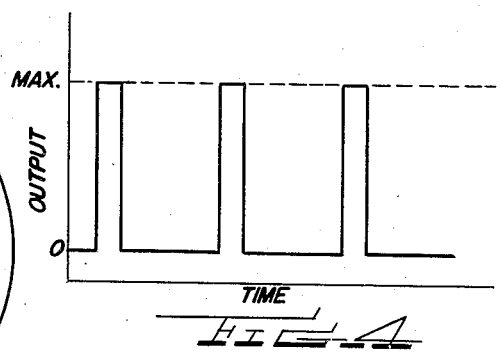
Fig. 4 shows the same, with an incandescent object.

Alternatively, with electronic scanning, the diameter of the rod may be measured in terms of the sweep voltage applied to the image tube 55 by oscillator 56 when the electron beam crosses each side of the image of the rod. One method of accomplishing this is illustrated in Fig. 11. The output of 58 is applied to the vertical deflecting plates of cathode-ray oscillograph tube 59. The output of oscillator 56 is applied to the horizontal plates. Then the wave-form such as shown in Figs. 3, 4 or 6a will be visualized on the face of the cathode-ray tube 59. The diameter of the rod may be calibrated on the face of the tube; as the deflection is proportional to the voltage, this measurement is made in terms of voltage.

The measurement of voltage difference at the beginning and end of the image may also be made electronically, rather than visually.

I claim:

1. In a device for measuring the length, width, diameter or other linear dimension of an object, the combination comprising means for establishing a background for the object whose radiation characteristic is distinctly different from that of the object, a radiation responsive scanning device, means for repeatedly sweeping said background and object from one boundary to the other along the particular dimension to be measured with said scanning device over a predetermined path, means for converting radiation received by said scanning device into an electric signal whose amplitude is dependent upon the radiation intensity, and means for measuring the average amplitude of said signal.

2. In a device for measuring the length, width, diameter or other linear dimension of an object, the combination comprising means for establishing a radiation image of the object against a contrasting background whose radiation characteristic is distinctly different from that of the object, a radiation responsive scanning device, means for repeatedly sweeping said background and image from one boundary to the other along the particular dimension to be measured with said scanning device over a predetermined path, means for converting radiation received by said scanning device into an electric signal whose amplitude is dependent upon the radiation intensity, and means for measuring the average amplitude of said signal.

3. In a device for measuring the length, width, diameter or other linear dimension of an object, the combination comprising means for establishing a background for the object whose radiation characteristic is distinctly different from that of the object, a scanning device including a radiation sensitive element effective to produce an output signal whose amplitude is dependent upon the radiation intensity, means for repeatedly sweeping said background and object from one boundry to the other along the particular dimension to be measured with said scanning device, said signal exhibiting a comparatively abrupt change in amplitude as said scanning device crosses each boundary of the object, and means for measuring the interval between successive abrupt changes in amplitude of said signal.

4. In a device for measuring the length, width, diameter or other linear dimension of an object, the combination comprising means for establishing a background for the object whose radiation characteristic is distinctly different from that of the object, a scanning device including a radiation sensitive element effective to produce an electrical signal whose amplitude is dependent upon the intensity of the radiation received by said element, means for repeatedly sweeping said background and object from one boundary to the other along the particular dimension to be measured with said scanning device, means differentiating said signal to produce an electrical output dependent upon the rate of change of said signal, and means for measuring the interval between successive maximums of said output.

5. In a device for measuring the length, width, diameter or other linear dimension of an object, the combination comprising means for establishing a background for the object whose radiation characteristic is distinctly different from that of the object, a scanning device including a radiation sensitive element effective to produce an output voltage whose amplitude is dependent upon the intensity of the radiation received by said element, means for repeatedly sweeping said background and object from one boundary to the other along the particular dimension to be measured with said scanning device, means differentiating said output voltage to produce a voltage signal dependent upon the rate of change of said output voltage, and means for measuring the interval between successive maximums of said signal.

6. In a device for measuring the length, width, diameter or other linear dimension of an object, the combination comprising means for establishing a background for the object whose radiation characteristic is distinctly different from that of the object, a scanning device including a radiation sensitive element effective to produce an output voltage whose amplitude is dependent upon the intensity of the radiation received by said element, means for repeatedly sweeping said background and object from one boundary to the other along the particular dimension to be measured with said scanning device, means differentiating said output voltage to produce a voltage signal dependent upon the rate of change of said output voltage, said voltage signal alternating in polarity as said scanning device crosses first one boundary and then the other of the object, and means for measuring the interval between successive changes in polarity of said voltage signal.

7. A measuring device as defined in claim 6 wherein said measuring means is comprised of a pair of control tubes interconnected to conduct alternately in accordance with the polarity of said voltage signal and means for measuring the average current flow in the plate circuit of one of said tubes during periods in which it is conductive.

8. In a device for measuring the length, width, diameter or other linear dimensions of an object, the combination comprising means for establishing a background for the object whose radiation characteristic is distinctly different from that of the object, a scanning device including a radiation sensitive element effective to produce an output voltage whose amplitude is dependent upon the intensity of the radiation received by said element, means for repeatedly sweeping said background and object from one boundary to the other along the particular dimension to be measured with said scanning device, means differentiating said output voltage to produce a voltage signal dependent upon the rate of change of said output voltage, said voltage signal alternating in polarity as said scanning device crosses first one boundary and then the other of said object, means duplicating said voltage signal in inverse phase, a peaking tube individual to and controlled by each of said voltage signals, each of said tubes developing a peaked negative voltage pulse in its space current circuit in response to an input voltage signal of positive polarity, a trigger circuit comprising a pair of tubes the inputs of which are coupled respectively to the outputs of said peaking tubes, the tubes of said trigger circuit being interconnected such that the appearance of a negative pulse on the grid of one renders the same non-conductive and the other conductive, and vice versa, and means for measuring the average current flow in the plate circuit of one of the tubes of said trigger circuit during its conductive periods.

9. In a device for measuring the length, width, diameter or other linear dimension of an object, the combination comprising means for establishing a background for the object whose radiation characteristic is distinctly different from that of the object, a scanning device including a radiation sensitive element effective to produce an output voltage whose amplitude is dependent upon the intensity of the radiation received by said element, means for repeatedly sweeping said background and object from one boundary to the other along the particular dimension to be measured with said scanning device, means differentiating said output voltage to produce a voltage signal dependent upon the rate of change of said output voltage, said voltage signal alternating in polarity as said scanning device crosses first one boundary and then the other of the object, means for transmitting only the highest positive and highest negative peaks of said signal, and means for measuring the interval between successive peaks in said signal.

FRANKLIN OFFNER.

REFERENCES CITED

The following references are of record in the file of this patent:

UNITED STATES PATENTS

| Number | Name | Date |
|---|---|---|
| 1,894,132 | Stone | Jan. 10, 1933 |
| 2,096,323 | Gille | Oct. 19, 1937 |
| 2,360,883 | Metcalf | Oct. 24, 1944 |